US008511202B2

(12) United States Patent
Mizushima

(10) Patent No.: US 8,511,202 B2
(45) Date of Patent: Aug. 20, 2013

(54) IGNITION SWITCH OPERATION RESTRICTING DEVICE

(75) Inventor: Hiroki Mizushima, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 72 days.

(21) Appl. No.: 13/236,806

(22) Filed: Sep. 20, 2011

(65) Prior Publication Data

US 2012/0085197 A1 Apr. 12, 2012

(30) Foreign Application Priority Data

Oct. 7, 2010 (JP) ................................ 2010-227160

(51) Int. Cl.
*G05G 5/06* (2006.01)

(52) U.S. Cl.
USPC ........................................................ 74/527

(58) Field of Classification Search
USPC ................................... 74/527; 70/182–184
See application file for complete search history.

(56) References Cited

U.S. PATENT DOCUMENTS

| | | | | |
|---|---|---|---|---|
| 2,909,940 | A * | 10/1959 | Dawkins | 74/527 |
| 6,718,805 | B2 * | 4/2004 | Okuno | 70/186 |
| 7,315,006 | B2 * | 1/2008 | Houck et al. | 200/331 |
| 2003/0231100 | A1 * | 12/2003 | Chung | 340/5.2 |
| 2004/0003632 | A1 * | 1/2004 | Ohtaki et al. | 70/252 |
| 2005/0115757 | A1 * | 6/2005 | Konno et al. | 180/289 |

FOREIGN PATENT DOCUMENTS

JP 2002-295089 10/2002

* cited by examiner

*Primary Examiner* — Vicky Johnson
(74) *Attorney, Agent, or Firm* — Roberts Mlotkowski Safran & Cole, P.C.

(57) ABSTRACT

An operation restricting device includes an operation knob to be turned by a user, a rotor member to rotate integrally with the operation knob, a case member enclosing the rotor member to be rotatable therein, a stopper member being movable along a radial direction of the rotor member in the rotor member, the stopper member restricting a rotation of the rotor member by engaging with a wall part of the case member, a spring for always providing a spring force biasing the stopper member outside the rotor member in the radial direction, a solenoid to retain a plunger by being energized, and a link member rotatably engaging with the plunger. When the solenoid is energized, the turning of the operation knob allows the stopper member to move back into the rotor member against the spring force such that the engaging of the stopper member is released.

6 Claims, 8 Drawing Sheets

IGNITION SWITCH OPERATION RESTRICTING DEVICE

The present application is based on Japanese patent application No. 2010-227160 filed on Oct. 7, 2010, the entire contents of which are incorporated herein by reference.

BACKGROUND OF THE INVENTION

1. Field of the Invention

This invention relates to an ignition switch operation restricting device and, in particular, to an ignition switch operation restricting device (or locking device) that is adapted to restrict the rotational operation of a vehicle ignition switch.

2. Description of the Related Art

In recent years, an electronic key system for vehicles is popularized that is adapted to allow or restrict an operation such as engine starting based on radio communications from an electronic key carried with a user. In the electronic key system, when an ID code from the vehicle key carried with the user is received by an authentication means and corresponds with an ID code previously registered, the locking state of the locking device for restricting the rotational operation of the ignition switch can be released.

JP-A-2002-295089 discloses an ignition switch operation restricting device that is provided with a first locking mechanism (i.e., knob locking mechanism) for restricting the rotational operation of an operation knob for switching the ignition switch from "LOCK (locking)" position to "ACC (accessory)" position, and a second locking mechanism (i.e., key interlocking mechanism) for restricting the reverse rotational operation of the operation knob from the "ACC" position to the "LOCK" position when the shift lever of the vehicle is located at N (neutral) position or D (drive) position other than the P (parking) position.

The first locking mechanism is adapted to restrict the rotational operation from the "LOCK" position to the "ACC" position when a first solenoid of an attraction type to draw a plunger in energized state is not energized, and to release the restriction of the rotational operation by energizing the first solenoid when the electronic key is authenticated.

The second locking mechanism, which is of the same attraction type as the first locking mechanism, is adapted to restrict the rotational operation of the operation knob by energizing the second solenoid (i.e., in the key interlocking state), and to permit the rotational operation from the "ACC" position to the "LOCK" position by de-energizing the second solenoid when the shift lever is located at the P position.

SUMMARY OF THE INVENTION

Thus, the ignition switch operation restricting device of JP-A-2002-295089 needs the attraction type solenoids as an actuator for restricting the rotational operation of the operation knob. However, the attraction type solenoids need a sufficient heat dissipation measure since it is relatively large in power consumption when drawing the plunger in the energized state. Also, there is a problem that the entire device increases in size since it uses the two solenoids for the first and second locking mechanisms.

Accordingly, it is an object of the invention to provide an ignition switch operation restricting device that the entire device can be downsized and the power consumption can be reduced.

(1) According to one embodiment of the invention, an operation restricting device for restricting a turning operation of an ignition switch of a vehicle comprises:

an operation knob to be turned by a user;

a rotor member to rotate integrally with the operation knob;

a case member enclosing the rotor member to be rotatable therein;

a stopper member being movable along a radial direction of the rotor member in the rotor member, the stopper member restricting a rotation of the rotor member by engaging with a wall part of the case member;

a spring for always providing a spring force biasing the stopper member outside the rotor member in the radial direction;

a solenoid to retain a plunger by being energized; and a link member rotatably engaging with the plunger, wherein, when the solenoid is energized, the rotation of the link member is restricted and the turning of the operation knob allows the stopper member to move back into the rotor member against the spring force by butting to a periphery of the stopper member to turn together with the operation knob such that the engaging of the stopper member with the wall part of the case member is released.

In the above embodiment (1) of the invention, the following modifications and changes can be made.

(i) The operation knob is operable to be pushed from a first position to a second position in a direction of a rotation axis thereof, wherein the operation restricting device further comprises an interlock device allowing the operation knob to be turned at the second position that the operation knob is pushed in, and wherein the rotor member comprises a protrusion on a periphery thereof for restricting the operation knob from being pushed from the first position to the second position by butting to the link member retained when the solenoid is energized.

(ii) The link member is adapted to rotate toward the rotor member to be retained at the rotor member when the solenoid is energized.

(iii) The link member is adapted to rotate toward the rotor member to be retained at the rotor member when the solenoid is energized.

(iv) The interlock device comprises:

a rotor case enclosing the rotor member to be rotatable therein; and a stopper plate being movable along a radial direction of the rotor member in the rotor member, the stopper plate restricting a rotation of the rotor member by engaging an outer portion thereof with an inner groove of the rotor case.

(v) The rotor member further comprises an extended shaft extending from the rotor member in the direction of the rotation axis, and the stopper plate comprises a cam hole into which the extended shaft penetrates, wherein, when the operation knob is pushed from the first position to the second position, the extended shaft is operable to move the stopper plate to a center of the rotor case so as to release the engaging of the outer portion of the stopper plate with the inner groove of the rotor case.

(vi) The extended shaft gradually increases in width toward the operation knob to move the stopper plate to the center of the rotor case.

Effects of the Invention

According to one embodiment of the invention, an ignition switch operation restricting device can be reduced in power consumption since a retention-type solenoid without attraction-driving a plunger is used as an actuator for restricting the turning operation of an operation knob. Further, the entire ignition switch operation restricting device can be downsized since only one solenoid is used for the two locking mechanisms, i.e., the knob locking and interlock mechanisms.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

Electronic Key System

Figure 1:
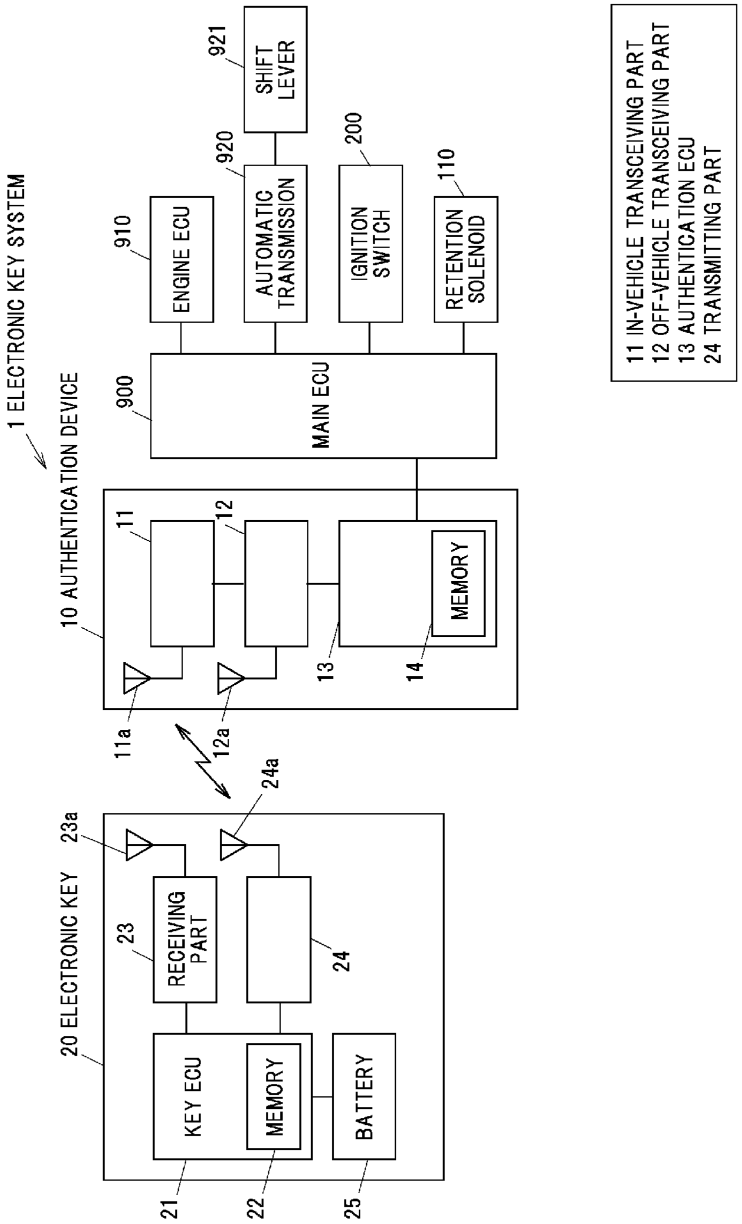
FIG. 1 is a block diagram showing one embodiment of an electronic key system installed in a vehicle.

FIG. 1 is a block diagram showing one embodiment of an electronic key system installed in a vehicle. The electronic key system 1 operates such that a short-distance radio communication is made between an authentication device 10 mounted on a vehicle and an electronic key 20 carried with the user, and operations such as opening/closing of the door or engine start are allowed when an ID code stored in the electronic key 20 is authenticated. Thus, when the electronic key 20 is authenticated, the user can enter into the vehicle and drive it without using the key. Also, it is very difficult for a person without carrying the electronic key 20 to externally conduct an unauthenticated unlocking operation. Accordingly, both the convenience for the user and the security can be enhanced.

The authentication device 10 of the electronic key system 1 is a control device that is installed in the vehicle as the authentication means of the electronic key 20, and comprises an in-vehicle transceiving part 11, an off-vehicle transceiving part 12, and an authentication ECU (electronic control unit).

The in-vehicle transceiving part 11 of the authentication device 10 is operable to receive/demodulate an RF radio signal from the electronic key 20 through an in-vehicle transceiving antenna 11*a*, and to modulate data such as communication control code into an RF signal and transmit it through the in-vehicle transceiving antenna 11*a*. The off-vehicle transceiving part 12 is operable to receive/demodulate an RF radio signal from the electronic key 20 through an off-vehicle transceiving antenna 12*a*, and to modulate data such as communication control code into an RF signal and transmit it through the off-vehicle transceiving antenna 12*a* outside the vehicle.

The authentication ECU 13 is a microcomputer integrating a CPU, a memory 14, a communication interface etc., and is connected to allow the communication with a main ECU 900 of the vehicle. The memory 14 of the authentication ECU 13 is to previously store the ID code as identification information of the vehicle. The authentication ECU 13 is connected to the in-vehicle transceiving part 11 and the off-vehicle transceiving part 12 in the authentication device 10 and generally controls the entire authentication device 10 including these.

The authentication 10 is connected to allow the communication with the main ECU 900 of the vehicle. The main ECU 900 is electrically connected with an engine ECU 910, an automatic transmission 920, an ignition switch 200, and a retention solenoid 110 as described later installed in a locking device of the invention. The automatic transmission 920 is connected with a shift lever 921 such that the information of switch position of the shift lever 921 is inputted through the automatic transmission 920 to the main ECU 900.

The electronic key 20 of the electronic key system 1 is composed of a key CPU 21, a receiving part 23, a transmitting part 24, and a battery 25. The key CPU 21 is composed of a microcomputer including a CPU, a memory 22 etc., and is connected with the receiving part 23, the transmitting part 24 and the battery 25 inside the electronic key 20.

The receiving part 23 is operable to receive through the receiving antenna 23*a* an RF radio signal such as communication control code transmitted from the authentication device 10 on the vehicle, and to send a demodulated signal to the key ECU 21. The transmitting part 24 is operable to modulate an ID code and communication control code etc. stored in the key ECU 21 into an RF signal according to the command from the authentication device 10 or periodically, and to send it to the authentication device 10 through the transmitting antenna 24*a*.

The electronic key 20 is provided as a small IC chip that integrates elements such as the key ECU 21, the receiving part 23 and the transmitting part 24 into one package. Meanwhile, the IC-chipped electronic key 20 may be used being buried in a regular key (which is not limited to one used for mechanical locking devices). Also, it may be used being mounted on a personal ID card of the user or a multifunction mobile terminal device such as a mobile phone.

Construction of the Locking Device

Figure 2:
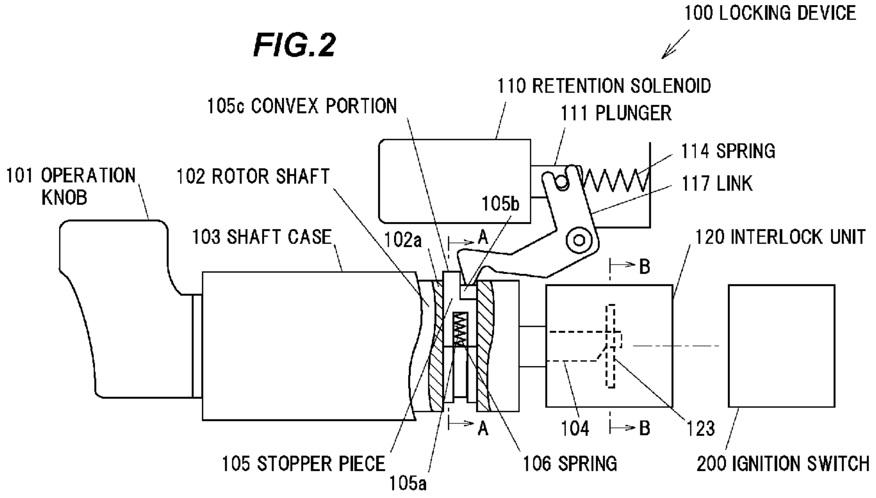
FIG. 2 is a schematic side view showing a locking device as an embodiment of an ignition switch operation restricting device according to the invention.

FIG. 2 is a schematic side view showing the locking device 100 as an embodiment of the ignition switch operation restricting device according to the invention. Meanwhile, in FIG. 2, for showing the inner structure of the locking device 100, a part of a shaft case 103 is broken and a part of a rotor shaft 102 is shown as a cross section (or a hatched part) (the same goes for FIGS. 6A and 7A).

The locking device 100 is adapted to restrict or permit the rotational operation to the ignition switch 200 of the vehicle.

As shown in FIG. 2, the locking device 100 is comprised of an operation knob 101 to be rotated by the user, a rotor shaft 102 as a rotor member to rotate integrally with the operation knob 101, a cylindrical shaft case 103 as a case member to house the rotor shaft 102 to be rotatable therein, the retention solenoid 110, and an interlock unit 120. An extended shaft 104 to integrally rotate with the rotor shaft 102 on the same axis is connected with an operation shaft of the ignition switch 200 such that the contact position of the ignition switch 200 can be switched by rotating the operation knob 101.

The rotor shaft 102 integrated with the operation knob 101 is housed in the shaft case 103 such that it can rotate therein and move along the rotation axis direction of the operation knob 101 in a predetermined range (i.e., a stand-by position to a push-in position). The rotor shaft 102 is biased in the direction of projecting the operation knob 101 by a spring (not shown) while being prevented from getting out of the shaft case 103. In other words, it is possible to push the operation knob 101 from a first position (or the stand-by position) projecting from the shaft case 103 to a second position (or the push-in position) being pushed in against the elastic repulsive force of the spring. When the user with the regular key turns the ignition switch 200 to "ACC" for starting the engine, or turns it "ACC" back to "LOCK" for stopping the engine, the turning operations are allowed by pushing the operation knob 101 to the second position (or the push-in position).

Figure 3A:
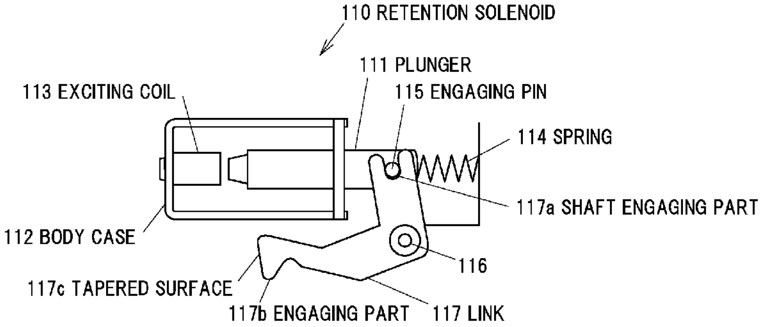
FIG. 3A is a schematic side view showing a retention solenoid in the ignition switch operation restricting device when it is not energized.
Figure 3B:
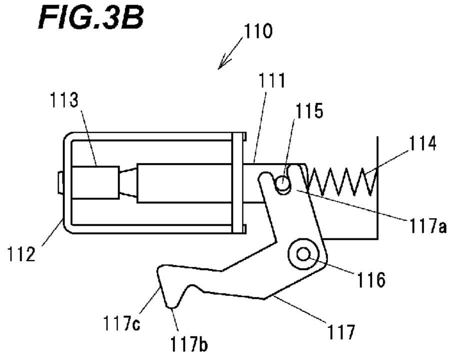
FIG. 3B is a schematic side view showing the retention solenoid in the ignition switch operation restricting device when it is energized.

FIG. 3A is a schematic side view showing the retention solenoid 110 being not energized. FIG. 3B is a schematic side view showing the retention solenoid 110 being energized. The retention solenoid 110 is comprised of a plunger 111 to move in the axis direction, an exciting coil 113 in a body case 112. A spring 114 engages with the plunger 111 such that an elastic repulsive force always acts in the direction of pushing the plunger 111 back to the body case 112.

The plunger 111 is provided with an engaging pin 115 extending in the direction orthogonal to the movement axis thereof. A shaft engaging part 117*a* at one end of a link 117 being rotatable around a support shaft 116 engages with the engaging pin 115 of the plunger 111. The link 117 is L-shaped bending near the support shaft 116, and integrally formed of a reinforced resin material such as PBT (polybuthylene terephthalate) including a glass fiber. An engaging part 117*b* is formed at the other end than the shaft engaging part 117*a* of the link 117, and provided with a tapered surface 117*c* at the side opposite the operation knob 101 inclining toward the rotor shaft 102.

The exciting coil 113 in the body case 112 of the retention solenoid 110 is constructed such that its magnetic pole, N pole or S pole is disposed at a position and a direction for facing the end of the plunger 111 of a magnetic material. When the retention solenoid 110 is not energized, no current is fed to the exciting coil 113 to produce a magnetic field, whereby the movement of the plunger 111 of the magnetic material is not restricted. Thus, when the retention solenoid 110 is not energized, the rotation of the link 117 can be permitted against the elastic repulsive force of the spring 114 acting on the plunger 111 (See FIG. 3A). On the other hand, when the retention solenoid 110 is energized to feed current to the exciting coil 113, the plunger 111 is attracted to the exciting coil 113 by magnetic force produced by the exciting coil 113 and held at the attracted position. Therefore, when the retention solenoid 110 is energized, the rotation of the link 117 engaging with the plunger 111 is also retained (See FIG. 3B).

Figure 4:
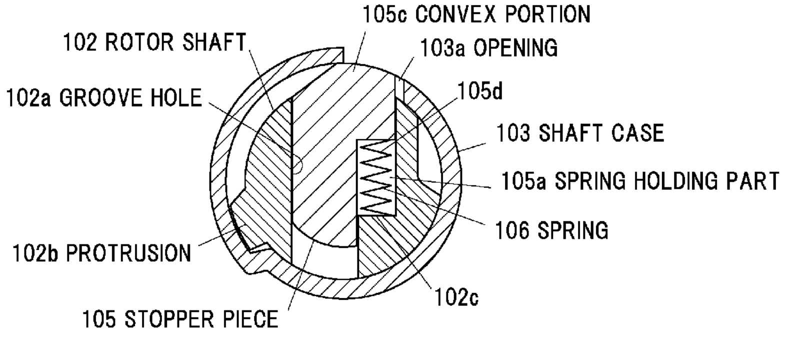
FIG. 4 is a cross sectional view cut along a line A-A in FIG. 2.

FIG. 4 is a cross sectional view cut along a line A-A in FIG. 2. As shown in FIG. 4, the rotor shaft 102 is provided with a vertical groove hole 102*a* hollowed along one diameter direction of the rotor shaft 102.

At the position A-A of the rotor shaft 102, a protrusion 102*b* is formed at a position inclining about 55 degrees (i.e., angle corresponding to the rotation operation from "LOCK" position to "ACC" position) in the counterclockwise direction relative to the groove hole 102*a* on the periphery of the rotor shaft 102.

Into the groove hole 102*a* of the rotor shaft 102, a stopper piece 105 as a stopper member is inserted. The stopper piece 105 is formed of a thick plate member and comprises a spring receiving part 105*a* at a side in the longitudinal direction formed by being notched into a vertical groove for enclosing a spring 106.

The spring 106 enclosed in the spring receiving part 105*a* includes, e.g., a coil spring that one end thereof is fixed to a step part 105*d* of the stopper piece 105 and the other end thereof is fixed to a step part 102*c* of formed in the groove hole 102*a* of the rotor shaft 102. When the stopper piece 105 is inserted into the groove hole 102*a* of the rotor shaft 102, the stopper piece 105 is always biased outside the rotor shaft 102 in the radial direction by an elastic repulsive force as a spring force of the spring 106 enclosed and compressed in the spring receiving part 105*a*. A part of the periphery of the stopper piece 105 is butted to the inner wall of the shaft case 103 so as to prevent the stopper piece 105 from getting out of the shaft case 103.

On the periphery of the stopper piece 105, an engaging groove 105*b* is formed by notching about two thirds of an edge on the opposite side to the operation knob 101 in the axis direction. In contrast, on the periphery of the stopper piece 105, a part of about one third except the engaging groove 105*b* is formed as a convex portion 105*c*.

At a first position (or stand-by position) where the operation knob 101 is at "LOCK" position and is not pushed, the link 117 is as shown in FIG. 2 disposed such that an engaging part 117*b* at an end thereof is adjacent to and opposite to a push-move side of the convex portion 105*c* at the periphery of the stopper piece 105. In detail, the retention solenoid 110 and the link 117 etc are disposed in such a positional relation that the engaging part 117*b* of the link 117 on which the elastic repulsive force of the spring 114 is acted downward is locked being caught in the engaging groove 105*b* of the stopper piece 105 located in an opening 103*a* of the shaft case 103.

Figure 5:
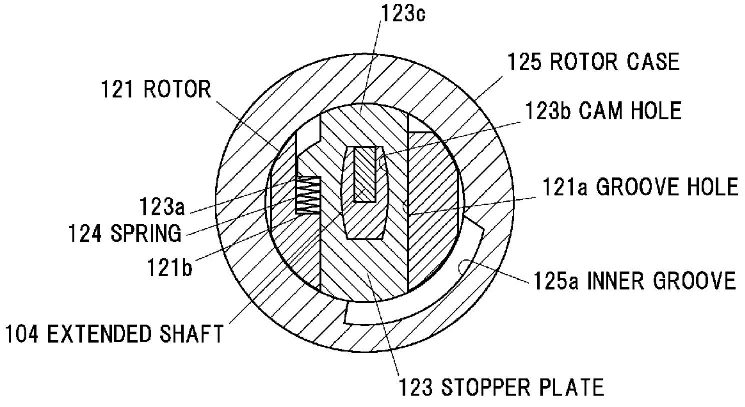
FIG. 5 is a cross sectional view cut along a line B-B in FIG. 2 for showing an interlock unit.

The construction of the interlock unit 120 will be described below. FIG. 5 is a cross sectional view cut along a line B-B in FIG. 2 for showing an interlock unit. As shown in FIG. 5, the interlock unit 120 is comprised of a rotor 121 to rotate integrally with the operation knob 101 by penetrating the extended shaft 104 of the operation knob 101 into a center part thereof, a stopper plate 123 to be movably inserted into a vertical groove hole 121*a* notched along one direction in the radial direction of the rotor 121, and a spring 124 for always biasing the stopper plate 123 outside in the radial direction of the rotor 121. These components are rotatably housed in a cylindrical rotor case 125.

On the inner wall of the rotor case 125 at B-B position, an inner groove 125*a* is formed that the rotor 121 allows an outer portion 123*c* of the stopper plate 123 to be inserted at a position corresponding to "ACC" position to "ON" position of the ignition switch 200.

The spring 124 includes, e.g., a coil spring that one end thereof is fixed to a step part 123*a* formed at one end of the stopper plate 123 and the other end thereof is fixed to a step part 121*b* formed in the groove hole 121*a* of the rotor 121.

At the center of the stopper plate 123, a cam hole 123*b* is formed through which the extended shaft 104 of the operation knob 101 penetrates. The width (i.e., a width in the longitudinal direction of a cross section along the moving direction of the stopper plate 123) of the extended shaft 104 engaging with the cam hole 123*b* is obliquely formed gradually widening (See a dotted line region in FIG. 2) toward the operation knob 101 from a position to engage with the cam hole 123*b* at the first position (or the stand-by position) where the operation knob 101 is not pushed in.

Thus, on the stopper plate 123, the elastic repulsive force (or spring force) of the spring 124 housed being compressed between the step part 123*a* and the step part 121*b* is acted. Thereby, as shown in FIG. 5, when the operation knob 101 is at the first position (or the stand-by position) where it is not pushed in and at the position corresponding to "ACC" position to "ON" position, the outer portion 123*c* of the stopper plate 123 is locked being inserted into the inner groove 125*a* of the rotor case 125. Therefore, the operation knob 101 is restricted to rotate from the position corresponding to "ACC" position to "ON" position. In contrast, when the operation knob 101 is at the second position (or push-in position) where it is pushed in, the extended shaft 104 moves to the side of the ignition switch 200, the stopper plate 123 moves back to the center of the rotor case 125 while the cam hole 123*b* engages with the extended shaft 104 gradually widening. As a result, the locking between the outer portion 123*c* of the stopper plate 123 and the inner groove 125*a* of the rotor case 125 is released so as to allow the turning rotation of the operation knob 101.

Knob Locking Operation of the Locking Device

Figure 6A:
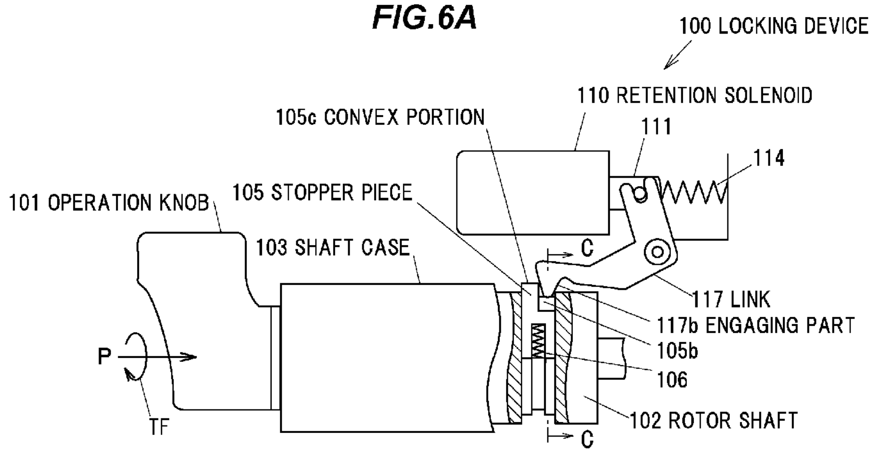
FIG. 6A is a schematic side view showing the locking device when an operation knob is at "LOCK" position.
Figure 6B:
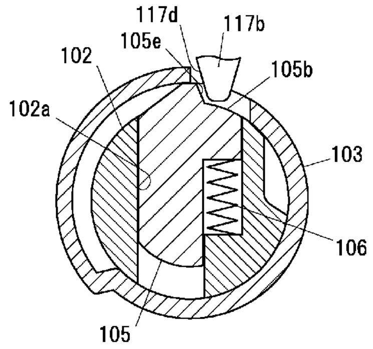
FIG. 6B is a cross sectional view cut along a line C-C in FIG. 6A.

The operations of the locking device 100 in the embodiment will be described below. FIG. 6A is a schematic side view showing the locking device when the engine of the vehicle is stopped and the operation knob 101 is at "LOCK" position. FIG. 6B is a cross sectional view cut along a line C-C in FIG. 6A.

In the vehicle with the engine stopped, when no user carrying the regular key 20 is on board so that the authentication device 10 cannot authenticate the ID code of the vehicle, the main ECU 900 controls the retention solenoid 110 to be de-energized so as to keep the locking of the engine start. When the retention solenoid 110 is de-energized (or not energized), though the rotation of the link 117 engaging with the plunger 111 is not restricted, the engaging part 117*a* of the link 117 is locked being caught in the engaging groove 105*b* of the stopper piece 105 by the elastic repulsive force of the spring 114 as described earlier.

At the locking state of the engine start, when the operation knob 101 is turned in the direction of an arrow "TF", the rotor shaft 102 and the stopper piece 105 are turned integrally with the operation knob 101. Here, the rotation of the link 117 is not restricted by the retention solenoid 110 at the de-energized state. Since the force by the spring 114 for pushing down the link 117 is less than the force by the spring 116 for pushing up the stopper piece 105, the engaging part 117*b* of the link 117 drives over the stopper piece 105 while a tapered surface 117*d* of the engaging part 117*b* of the link 117 butts to a tapered surface 105*e* of the stopper piece 105 being moved (or turned).

Thus, at the locking state, as shown in FIG. 4 (A-A section in FIG. 2), the periphery (i.e., convex portion 105*c*) of the stopper piece 105 is biased to the side of the opening 103*a* of the shaft case 103. Even if the operation knob 101 is tried to be turned to the "ACC" position, the convex portion 105*c* of the stopper piece 105 butts to an edge of the opening 103*a* as a wall part of the shaft case 103, so that the turning of the operation knob 101 is still restricted.

Figure 10A:
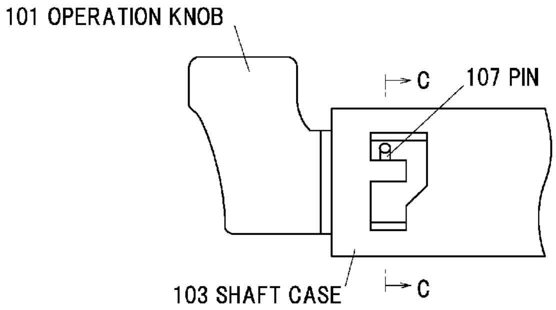
FIG. 10A is a schematic side view showing the locking device when the operation knob is at the "LOCK" position.
Figure 10B:
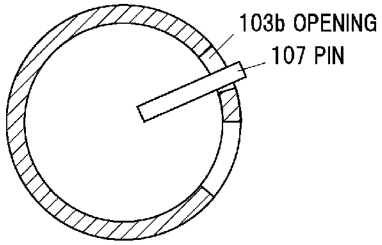
FIG. 10B is a cross sectional view cut along a line C-C in FIG. 10A.

Further, at the locking state of the engine start, when the operation knob 101 is tried to be turned to the "ACC" position without being pushed in the direction of an arrow "P", as shown in FIG. 10, a pin 107 press-fitted in the operation knob 101 butts to an edge of an opening 103*b* of the shaft case 103, so that the turning of the operation knob 101 is still restricted as well.

Figure 7A:
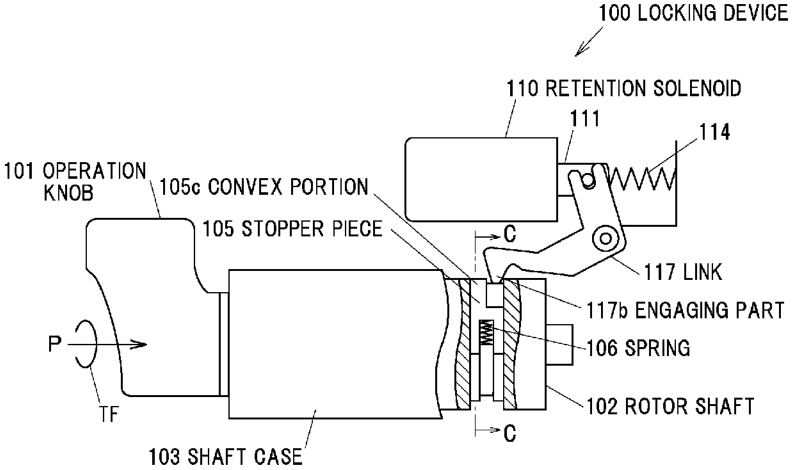
FIG. 7A is a schematic side view showing the locking device when the locking of engine start is released and the operation knob is pushed.
Figure 7B:
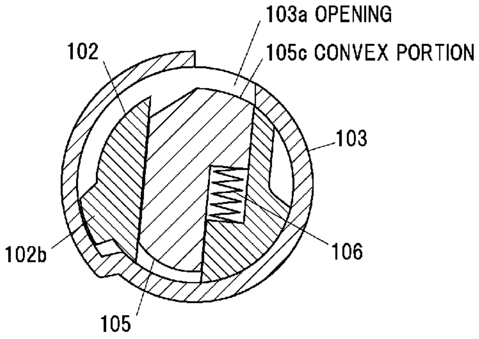
FIG. 7B is a cross sectional view cut along a line C-C in FIG. 7A.

FIG. 7A is a schematic side view showing the locking device 100 when the locking of engine start is released and the operation knob 101 is pushed. FIG. 7B is a cross sectional view cut along a line C-C in FIG. 7A.

When the user carrying the regular key 20 is on board so that the authentication device 10 can authenticate the ID code of the vehicle, the main ECU 900 controls the retention solenoid 110 to be energized so as to release the locking of the engine start. When the retention solenoid 110 is energized, the plunger 111 is attracted by the exciting coil 113 such that the rotation of the link 117 is retained (or restricted).

As shown in FIG. 6A, when the operation knob 101 is turned in the direction of the arrow "TF" at the released state of the locking of the engine start, the rotor shaft 102 and the stopper piece 105 are turned integrally with the operation knob 101. Here, as shown in FIG. 6B, the tapered surface 105*e* of the stopper piece 105 butts to the tapered surface 117*d* of the engaging part 117*b* of the link 117. As a result, the stopper piece 105 moves to the central side of the groove hole 102*a* of the rotor shaft 102 according to the turning operation of the operation knob 101 while allowing the tapered surface 105*e* of the stopper piece 105 to butt to the tapered surface 117*d* of the engaging part 117*b* of the link 117. Thereby, as shown in FIG. 7B, the convex portion 105*c* of the stopper piece 105 moves back from the opening 103*a* so as to release the locking state between the stopper piece 105 and the wall part (or edge) of the shaft case 103. As a result, the turning of the operation knob 101 to the "ACC" position as shown by the arrow "TF" can be permitted.

Interlock Operation of the Locking Device

Figure 8A:
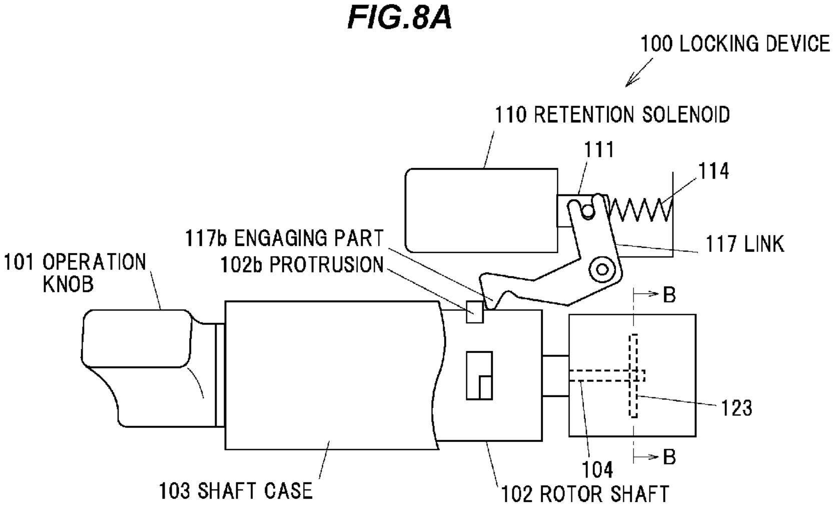
FIG. 8A is a schematic side view showing the locking device when the engine stop is locked.
Figure 8B:
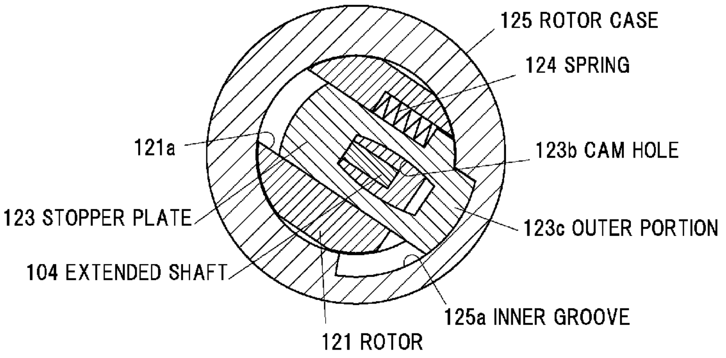
FIG. 8B is a cross sectional view cut along a line B-B in FIG. 8A for showing the interlock unit.

The key interlock operation of the locking device 100 in the embodiment to be conducted when stopping the operated engine will be described below. FIG. 8A is a schematic side view showing the locking device 100 when the engine stop is locked (or at the key interlock state). FIG. 8B is a cross sectional view cut along a line B-B in FIG. 8A for showing the interlock unit 120.

The main ECU 900 keeps the key interlock state of the engine stop by energizing the retention solenoid 110 if it detects the shift lever 921 being located at "N (neutral)" or "D (drive)" position other than "P (parking)" position when the engine operates.

At the key interlock state, when the operation knob 101 is located at the turning operation position corresponding to "ACC" or "ON" of the ignition switch 200, as shown in FIG. 8A, the engaging part 117*b* is located on the side of the interlock unit 120 from the protrusion 102*b* of the rotor shaft 102 to retain (or restrict) the rotation of the link 117.

Thus, at the key interlock state, the movement of the protrusion 102*b* of the rotor shaft 102 is blocked by the engaging part 117*b* of the link 117, so that the operation knob 101 cannot be pushed in. Therefore, as shown in FIG. 8B, the engaging state between the outer portion 123*c* of the stopper plate 123 and the inner groove 125*a* is retained, so that the operation knob 101 is restricted from turning from the "ACC" position to "LOCK" position.

Figure 9A:
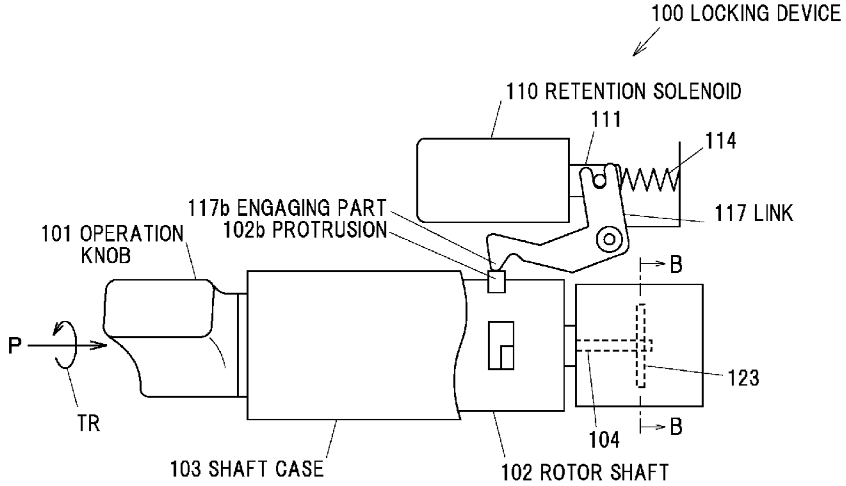
FIG. 9A is a schematic side view showing the locking device when the locking of the engine stop is released.

FIG. 9A is a schematic side view showing the locking device 100 when the locking of the engine stop is released.

Figure 9B:
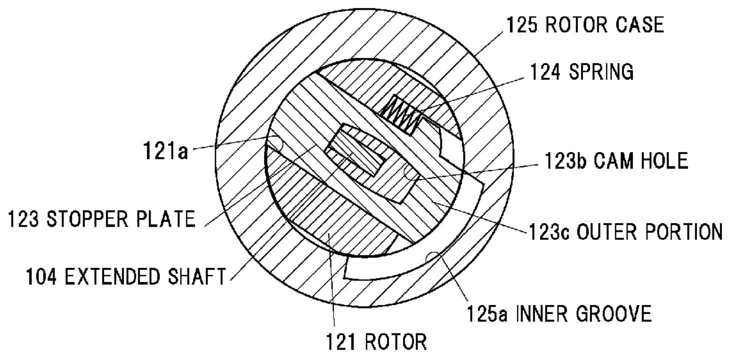
FIG. 9B is a cross sectional view cut along a line B-B in FIG. 9A for showing the interlock unit.

FIG. 9B is a cross sectional view cut along a line B-B in FIG. 9A for showing the interlock unit 120.

If the main ECU 900 detects the shift lever 921 being located at the "P" position when the engine operates, it controls the retention solenoid 110 to be de-energized so as to release the key interlock state at the time of the engine stop. When the key interlock state is released, the rotation of the link 117 is not retained (or restricted) by the de-energized retention solenoid 110, so that the operation knob 101 can be pushed in the direction of the arrow "P". Here, as shown in FIG. 9A, the engaging part 117*b* of the link 117 drives over the protrusion 102*b* while the tapered surface 117*c* of the engaging part 117*b* of the link 117 butts to the protrusion 102*b* being moved.

When the operation knob 101 is at the second position (or push-in position) by being pushed in, the interlock unit 120 operates such that the stopper plate 123 moves back to the center of the rotor case 125 while the cam hole 123*b* of the stopper plate 123 engages with the extended shaft 104 which moves together with the operation knob 101. As a result, the locking between the outer portion 123*c* of the stopper plate 123 and the inner groove 125*a* of the rotor case 125 is released so as to allow the turning operation of the operation knob 101 in the arrow "TR" direction for turning back to the "LOCK" position.

Effects of the Embodiment

According to the embodiment, the rotor shaft 102 moving with the operation knob 101 is provided with the movable stopper piece 105 such that the turning operation of the operation knob 101 can be restricted from turning by butting the periphery of the stopper piece 105 to the edge of the opening 103*a* as the wall part of the shaft case 103. Also, the engaging part 117*b* at the end of the link 117 to be retained by the retention solenoid 110 is disposed opposite to the convex portion 105*c* formed on the periphery of the stopper piece 105. Thereby, when the retention solenoid 110 is energized, the tapered surface 105*e* of the stopper piece 105 butts to the engaging part 117*b* of the link 117 in turning the operation knob 101 to allow the stopper piece 105 to move back such that the engaging (or locking) between the stopper piece 105 and the wall part of the shaft case 103. Thus, the retention type solenoid 110 is used as an actuator to control the locking of the operation knob 101 so as to reduce the power consumption of the locking device 100.

Also, according to the embodiment, at the turning operation position of the operation knob 101 corresponding to "ACC", the protrusion 102*b* is disposed on the periphery of the rotor shaft 102 to be opposite the engaging part 117*b* of the link 117 engaging with the retention solenoid 110. When the retention solenoid 110 is energized, the protrusion 102*b* is restricted from moving by the engaging part 117*b* of the link 117 with the turning operation retained so as to restrict the push-in operation of the operation knob 101. Thus, the retention solenoid 110 for the above locking control is also used as an actuator for the key interlock control such that the one retention solenoid 110 can have both the knob lock function and the key interlock function so as to downsize the entire locking device 100.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An operation restricting device for restricting a turning operation of an ignition switch of a vehicle, comprising:

an operation knob to be turned by a user;

a rotor member to rotate integrally with the operation knob;

a case member enclosing the rotor member to be rotatable therein;

a stopper member being movable along a radial direction of the rotor member in the rotor member, the stopper member restricting a rotation of the rotor member by engaging with a wall part of the case member;

a spring for always providing a spring force biasing the stopper member outside the rotor member in the radial direction;

a solenoid to retain a plunger by being energized; and a link member rotatably engaging with the plunger, wherein, when the solenoid is energized, the rotation of the link member is restricted and the turning of the operation knob allows the stopper member to move back into the rotor member against the spring force by butting to a periphery of the stopper member to turn together with the operation knob such that the engaging of the stopper member with the wall part of the case member is released wherein the link member is adapted to rotate toward the rotor member to be retained at the rotor member when the solenoid is energized.

2. The operation restricting device according to claim 1, wherein the operation knob is operable to be pushed from a first position to a second position in a direction of a rotation axis thereof, wherein the operation restricting device further comprises an interlock device allowing the operation knob to be turned at the second position that the operation knob is pushed in, and wherein the rotor member comprises a protrusion on a periphery thereof for restricting the operation knob from being pushed from the first position to the second position by butting to the link member retained when the solenoid is energized.

3. The operation restricting device according to claim 2, wherein the interlock device comprises:

a rotor case enclosing the rotor member to be rotatable therein; and a stopper plate being movable along a radial direction of the rotor member in the rotor member, the stopper plate restricting a rotation of the rotor member by engaging an outer portion thereof with an inner groove of the rotor case.

4. The operation restricting device according to claim 3, wherein the rotor member further comprises an extended shaft extending from the rotor member in the direction of the rotation axis, and the stopper plate comprises a cam hole into which the extended shaft penetrates, wherein, when the operation knob is pushed from the first position to the second position, the extended shaft is operable to move the stopper plate to a center of the rotor case so as to release the engaging of the outer portion of the stopper plate with the inner groove of the rotor case.

5. The operation restricting device according to claim 4, wherein the extended shaft gradually increases in width toward the operation knob to move the stopper plate to the center of the rotor case.

6. An operation restricting device for restricting a turning operation of an ignition switch of a vehicle, comprising:

an operation knob to be turned by a user;

a rotor member to rotate integrally with the operation knob;

a case member enclosing the rotor member to be rotatable therein;

a stopper member being movable along a radial direction of the rotor member in the rotor member, the stopper member restricting a rotation of the rotor member by engaging with a wall part of the case member;

a spring for always providing a spring force biasing the stopper member outside the rotor member in the radial direction;

a solenoid to retain a plunger by being energized; and a link member rotatably engaging with the plunger, wherein, when the solenoid is energized, the rotation of the link member is restricted and the turning of the operation knob allows the stopper member to move back into the rotor member against the spring force by butting to a periphery of the stopper member to turn together with the operation knob such that the engaging of the stopper member with the wall part of the case member is released, and wherein the operation knob is operable to be pushed from a first position to a second position along an axis of rotation thereof, and further comprising an interlock device allowing the operation knob to be turned at the second position that the operation knob is pushed in.

* * * * *